Aug. 6, 1935. T. B. KOHLER 2,010,401
TRANSMISSION
Filed Nov. 18, 1931 3 Sheets-Sheet 2

INVENTOR.
Theodor B. Kohler
BY
ATTORNEY.

Aug. 6, 1935.  T. B. KOHLER  2,010,401
TRANSMISSION
Filed Nov. 18, 1931   3 Sheets-Sheet 3

INVENTOR.
Theodor B. Kohler
BY
*Grant B. Baldwin*
ATTORNEY.

Patented Aug. 6, 1935

2,010,401

UNITED STATES PATENT OFFICE 2,010,401

TRANSMISSION

Theodor B. Kohler, Detroit, Mich.

Application November 18, 1931, Serial No. 575,862

22 Claims. (Cl. 60—54)

This invention relates to improvements in transmissions. It is an object of the invention to provide a transmission wherein power is transmitted from the drive to the driven shaft by hydraulic means, and wherein the torque decreases as the speed of rotation of the driven shaft increases.

Another object of the invention is to provide a transmission wherein as the speed of rotation of the driven shaft increases an increasing amount of power is transmi..ed mechanically from the drive to the driven shaft.

A further object of the invention is to provide a transmission having means for reversing the direction of rotation of the driven shaft without resorting to geared means to accomplish this purpose.

Yet another object of the invention is to provide a transmission consisting of a housing from which both a drive and a driven shaft project, and to arrange a direction valve in the housing which is rotated with the driven shaft and is also rotatable by separate hydraulic means about a spindle the axis of which is angularly disposed to the drive shaft and rotated thereby so that impellers mounted on the spindle may throw liquid in either of two directions and thereby cause rotation in either direction of the driven shaft.

Another object of the invention is to provide a transmission whereby gradually increasing speed is imparted partially hydraulically and partially mechanically to the driven shaft as the torque decreases and while the drive shaft turns at constant speed.

A preferred embodiment of the invention is hereinafter more fully described with the aid of the accompanying drawings in which:

Figure 1 illustrates a cross section of the invention.

Figures 2 and 3 are sections on the lines 2—2 and 3—3 of Figure 1.

Figure 1:
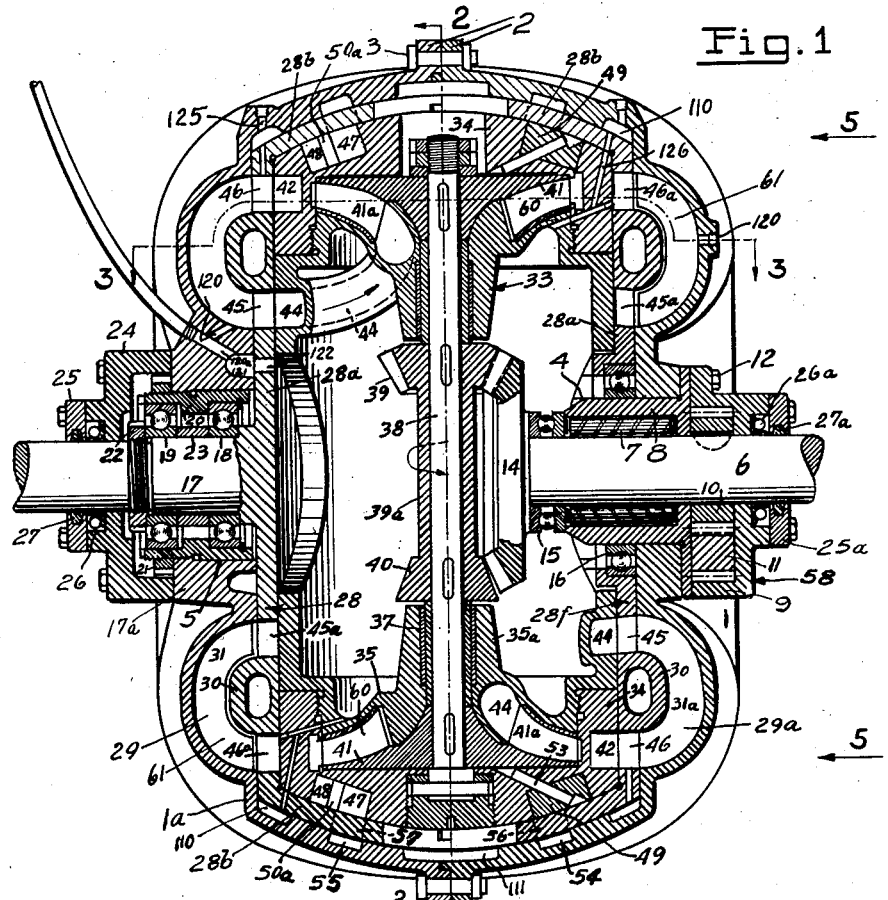
Figure 2:
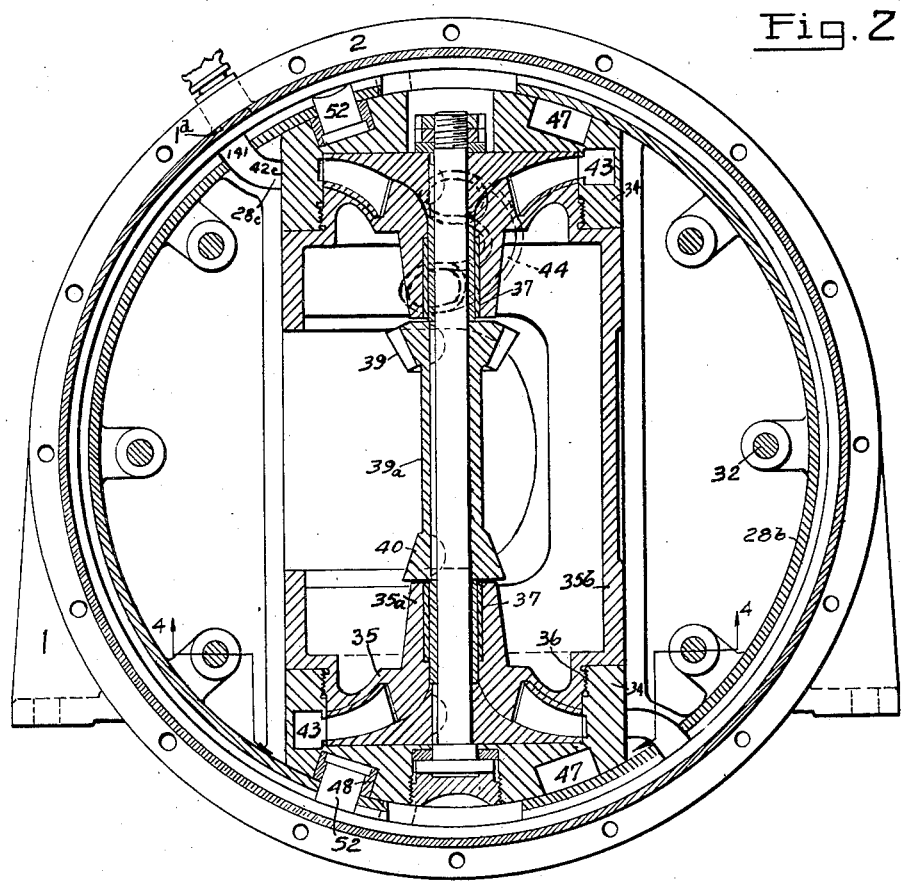
Figure 4:
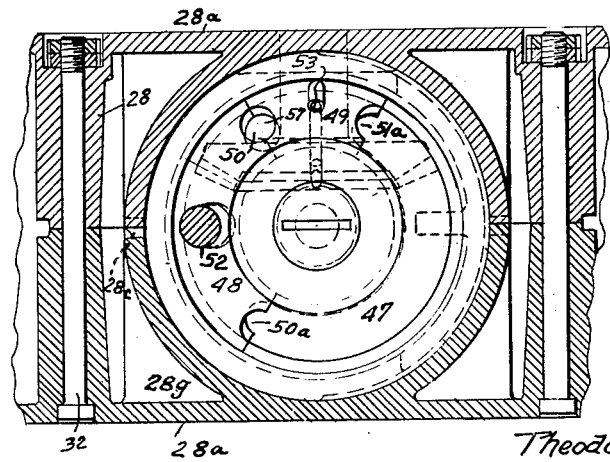
Figure 4 is a section on the line 4—4 of Figure 2.
Figure 5:
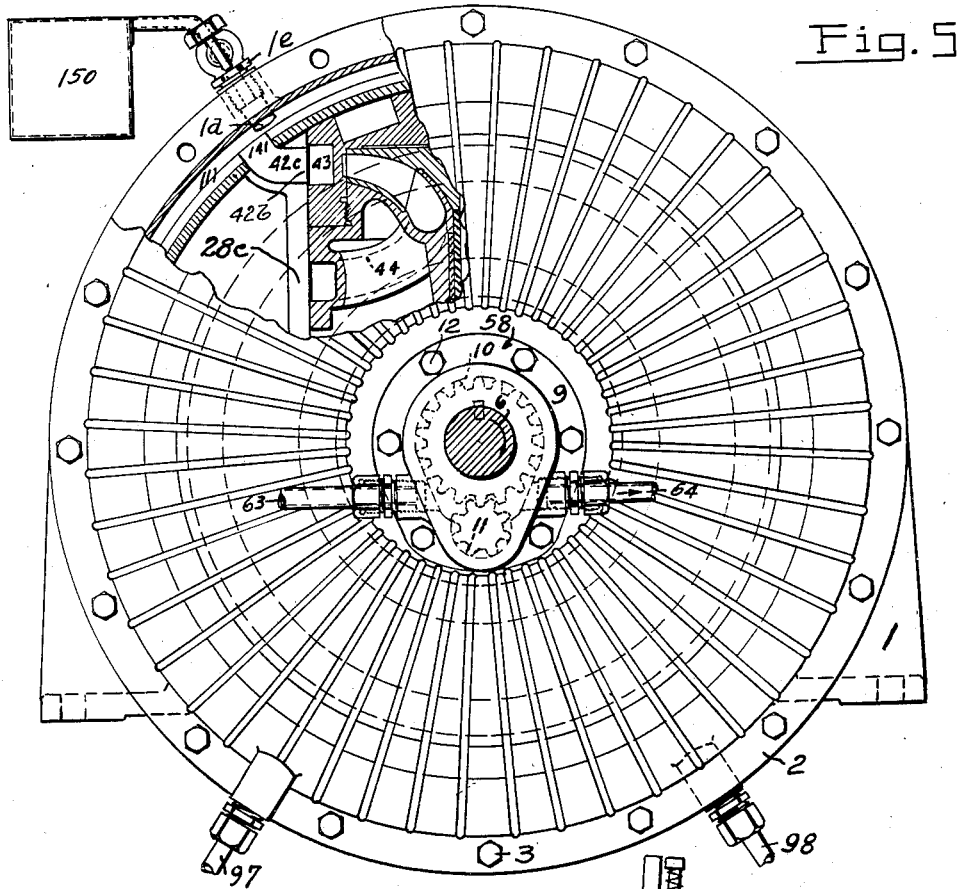
Figure 5 is a view on the line 5—5 of Figure 1, wherein a portion is shown in section.
Figure 6:
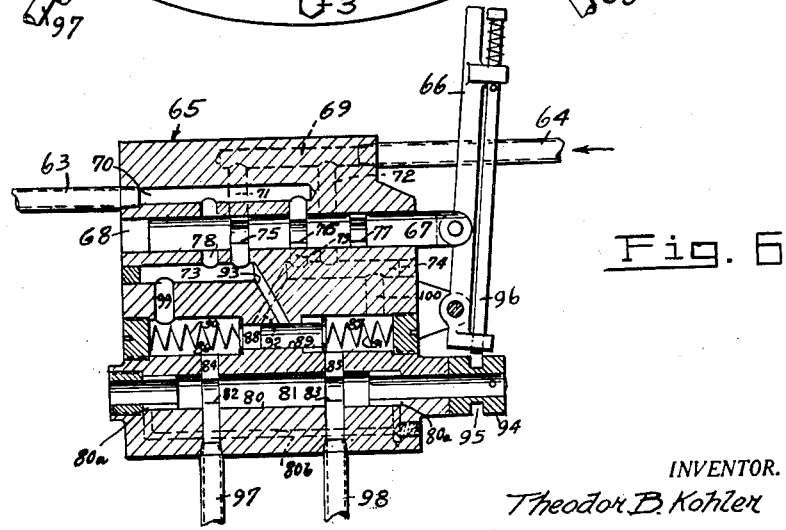
Figure 6 is a sectional view of a hydraulic valve.

Referring to the drawings, I designates a housing of circular section consisting preferably of two similar portions having external flanges 2 around their adjacent margins which are suitably held together as by bolts 3. Centrally of the housing I and through both ends thereof aligned apertures 4 and 5 are formed.

Through the aperture 4 a drive shaft 6 extends which is journalled in a roller bearing 7 the race 8 of which is supported by the housing I. The outer end of the race 8 is externally flanged and forms one side of a rotary pump casing 9 having cooperating rotors 10 and 11 therein, the former of which is fixed around the drive shaft 6. Screws 12 extend through the pump casing 9 and the flanged portion of the race 8 and are in threaded engagement with the housing I. On the extremity of the drive shaft 6 within the housing I a bevel gear 14 is secured and between the latter and the inner extremity of the roller bearing 7 is a thrust bearing 15. 16 denotes a ball bearing provided around the roller bearing 7 intermediately of its length, the purpose of which will become apparent hereinafter.

Through the housing aperture 5 a driven shaft 17 extends which is rotatably supported by ball bearings 18 and 19 mounted within a sleeve 20 in threaded engagement with the said aperture 5. 21 denotes a retaining nut for preventing accidental disengagement of the sleeve 20, and around the driven shaft 17 a threaded collar 22 is provided for holding the bearings 18 and 19 in position. The inner races of the said bearings 18 and 19 are spaced by means of a washer 23. A cap 24 extends over the outer faces of the sleeve 20, nut 21, and collar 22; and against the outer face of the said cap 24 a washer 25 is arranged. 26 and 27 designate conventional forms of liquid sealing rings in the cap 24 and washer 25 respectively. These liquid sealing rings are duplicated at 26a and 27a in the pump casing 9 and in a washer 25a, which rests against the outer face of the said casing 9, respectively.

On the inner extremity of the driven shaft 17, and in the present instance having one half thereof formed integral therewith, is a hollow casing 28, the other and detachable half 28f of which is secured thereto as by bolts 32. The opposed sides 28a of the casing 28 extend substantially radially relative to the axis of the driven shaft 17, and the rim wall 28b of the said casing is circular and concentric with the axis of the said shaft 17. In the side 28a of the detachable portion 28f an opening is formed to receive the outer race of the ball bearing 16. Both the sides 28a and the rim wall 28b of the casing 28 rest contiguous to the corresponding wall portions of the housing I in which the said casing is rotatable about the axis of the driven shaft 17. Around the inner side of both end walls Ia of the housing I outwardly directed annular grooves 29 and 29a are formed concentrically into which, but spaced from them, annular projections 30 integral with the casing sides 28a extend, thereby forming passages 31 and 31a which, in section, are substantially U-shaped. Extending transversely of each groove 29 and 29ᵃ is at least one rib 61 which prevents rapid circular flow of liquid therearound. Formed integral with the casing 28 and having opposed portions thereof united with the casing sides 28a is a cylindrical portion 28c the axis of which lies at right angles to the aligned axes of both the drive and driven shafts 6 and 17; the ends of the cylindrical portion 28c are formed by portions of the outer casing wall 28b.

Within the casing 28 is a direction valve or element generally referred to by the ordinal 33; this valve is so positioned as to rotate in the casing 28 about the axis of a spindle 38 hereinafter referred to in a manner hereinafter described, and consists of two outer valve portions 34 and an inner valve portion 35 mounted within the cylindrical casing portion 28c so as to turn about the axis of the driven shaft 17 with the casing 28. The outer valve portions 34 are secured to the inner valve portion 35 by means of cooperating screw threads 36, and the central portions 35a of the said inner valve portion 35 are connected to one another by means of a segmental wall 35b which extends through less than a semi-circle for reasons which will become apparent hereinafter.

Extending centrally through both inner valve portions 35a are bearings 37 in which a spindle 38 is rotatably supported at right angles to the axis of the drive shaft 6. Fixed on the spindle 38 is a sleeve 39a having a bevel pinion 39 thereon which meshes with the bevel gear 14; and 40 denotes a balance weight also integral with the sleeve 39a to counterbalance the pinion 39. This balance weight is preferably positioned the same distance from the axis of the drive shaft 6 as the said pinion 39 and is distributed evenly around the spindle 38, since the direction valve 33 rotates about the axis of the driven shaft 17 simultaneously with the rotation of the spindle 38 about its own axis, and therefore the said spindle must be balanced for rotation about the axis of the driven shaft 17.

In enclosed spaces or cavities 60 formed between adjacent faces of the inner and outer valve portions 35 and 34 impellers 41 are secured around the spindle 38. Projecting inwardly from the faces of the said impellers 41 are radial blades 41a.

Formed through the periphery of each outer valve portion 34 is a tangential discharge passage 42 which constitutes a continuation of a substantially semi-circular groove or depression 43, the base of which is somewhat eccentric. This groove 43 is formed around a portion of the periphery of the cavity 60 adjacent which the outer margins of the impeller blades rotate. Extending through the inner valve portion 35 from its periphery are substantially spiral inlet passages 44 which open into the inner sides of cavities 60 so that liquid delivered through them passes to the inner sides of the impeller blades 41a. Formed through the casing sides 28a are opposed inlet ports 45 and 45a and opposed outlet ports 46 and 46a which are in registry with the U-shaped housing passages 31 and 31a. The direction valve 33 is rotatable in the casing 28 by means not yet described. When the ports 45 and 46 are in registry with the passages 44 and 42 rotary movement is imparted to the casing 28 in one direction about the axis of the driven shaft 17 by the reactive effect of the liquid thrown by the impeller blades 41a against the bases of the grooves or depressions 43, and when the ports 45a and 46a are in registry with the passages 42 and 44 (which is accomplished by turning the direction valve 33 within the casing 28) rotation of the casing 28 in the opposite direction is similarly obtained about the driven shaft axis but in the opposite direction. It will also be noted that since the two spiral inlet passages 44 and the two tangential discharge passages 42 are positioned on opposite sides of the axis of the driven shaft 17 that they are formed in opposite directions. Moreover due to the fact that the housing grooves 29 and 29a are annular the passages 31 and 31a always remain in registry with the inlet and discharge ports 45 and 46 and 45a and 46a throughout the rotation of the casing 28 in the housing 1.

In order that the direction valve 33 may be partially rotated within the casing the following construction is provided. In the outer faces of the outer valve portions 34 annular grooves 47 are formed concentric with the axis of the spindle 38. In each groove two segmental plates 48 and 49 are provided which have openings 50 and 50a and 51 and 51a, usually substantially semi-circular, formed transversely of their extremities. Intermediately of its length each segmental plate 48 is secured to the casing 28 by a pin 52, and each segmental plate 49 is secured to one outer valve portion 34 by a pin 53. Formed within the housing 1 are parallel annular grooves 54 and 55. The groove 54 is in communication with the transverse segmental plate opening 50 through an opening 56 formed through the casing 28 and the groove 55 is in communication with the transverse segmental plate opening 50a through a second opening 57 also formed through the casing 28. In-so-much that the outer sides of the annular grooves 47 are closed by the rim wall 28b of the casing 28, liquid pressure entering the grooves 54 and into the segmental plate openings 50 forces the segmental plates 49 away from the adjacent ends of the plates 48 and around the axis of the spindle 38 carrying the valve 33 with it. Thus the valve 33 is turned about the axis of the spindle 38 until the opposite ends of the plates 48 and 49 come into contact. Similarly when liquid pressure is exerted through the grooves 55 and passes into the segmental plate openings 50a the segmental plates 49 and the valve 33 are moved in the opposite direction around the axis of the spindle 38 until they are returned to their initial positions shown.

From the foregoing it will be seen that the angle through which the segmental valve wall 35b extends must be such that its ends are clear of the drive shaft 6 and its supporting parts at both ends of its rotary travel.

A rotary pump 58 of which the rotary pump casing 9 forms a part is employed for creating liquid pressure for accomplishing this purpose. Connected to the pump casing 9 are suction and discharge pipes 63 and 64 respectively, and 65 denotes an operating valve. Pivotally mounted on the valve 65 is an operating lever 66 and pivoted to the latter is a plunger 67 slidable in a cylinder 68.

The discharge pipe 64 terminates in a pressure cavity 69 and the suction pipe 63 terminates in a suction cavity 70. The pressure cavity 69 is connected to the interior of the cylinder 68 by two separate passages 71 and 72 which are also in communication with longitudinal apertures 73 and 74 respectively formed within the said valve when the plunger 67 is in certain positions. Around the plunger 67 annular recesses 75, 76 and 77 are formed, and extending through the cylinder are passages 78 and 79 which connect the aperture 73 with the suction cavity 70 and the aperture 74 with the suction cavity 70 respectively when the said plunger 67 is in certain positions.

Parallel with the cylinder 68, a second cylinder 80 is formed in the valve 65, which has a piston 81 therein, the intermediate portion of which is annularly grooved at 82 and 83. Through the valve 65 apertures 84 and 85 are formed which extend into the cylinder 80 and through it into chambers 86 and 87; these apertures 84 and 85 are normally in registry with the annular piston grooves 82 and 83. Connecting the chambers 86 and 87 is a passage 88 slidable in which is a pin 89. The outer extremities of the chambers 86 and 87 are closed and extending longitudinally of the said chambers are springs 90 and 91 which exert pressure against opposite ends of the pin 89. From the passage 88 inclined ports 92 and 93 extend into the apertures 74 and 73 respectively. Fixed around one extremity of the piston 81 is a collar 94 having an annular recess 95 therein which is adapted to be engaged by a rod 96 mounted on the operating lever 66 so as to be axially slidable. The longitudinal apertures 73 and 74 are connected to the chambers 86 and 87 respectively by ports 99 and 100. From the valve aperture 84 a pipe 97 extends to the housing groove 54, and from the valve aperture 85 another pipe 98 extends to the housing groove 55.

The operation of the valve is as follows: When the valve ports are in substantially the positions shown liquid pressure flows from the pressure cavity 69 through the passage 71, around the plunger recess 75 to the cavity 73 and from the latter through the port 99 into the chamber 86 from which it passes through the aperture 84, around the annular recess 82 of the piston 81 and through the pipe 97 into the housing groove 54. At the same time liquid is being forced out of the housing groove 55 through the pipe 98 due to the decrease in volume of the annular space between the opposite spaced ends of the segmental plates 48 and 49. This liquid flows through the aperture 85 around the annular piston groove 83 and into the chamber 87 from which it passes through the port 100 into the aperture 74, through the passage 79 and around the plunger groove 76 to the suction cavity 70.

During this time the pin 89 remains substantially centrally positioned in its passage 88 thereby holding both ports 92 and 93 closed. But as soon as the liquid has performed its function excess pressure is built up as the volume between the openings 50 and 51 in adjacent ends of the plates 48 and 49 cannot be further increased. This excess pressure in the chamber 86 overcomes the tension of the spring 91 and moves the pin 89 into the position shown so that surplus liquid then travels back to the suction cavity 70, through the port 92, the aperture 74 and the passage 79.

It will be clearly seen from the foregoing that when the lever 66 is moved so as to bring the plunger groove 77 into registry with the passage 72 liquid then flows from the pressure cavity 69 to the aperture 74, to the chamber 87 and from the latter into the pipe 98 so that pressure is exerted on the liquid in the housing groove 55 thereby turning the segmenal plate 49 and direction valve 33 in the opposite direction. The surplus liquid returning from the housing groove 54 passes through the aperture 84, chamber 86, port 99, aperture 73 and from the latter into the suction cavity 70 through the passage 78.

It will be seen that normally the rod 96 is held out of engagement with the collar groove 95, so that the piston 81 remains stationary. Between the extremities of the cylinder 80 and the piston 81 annular spaces 80a filled with liquid are formed. These spaces are connected by a suitably formed passage 80b of relatively narrow cross section. When it is desired to move the direction valve 33 into neutral position, that is with its inlet and discharge passages 44 and 42 out of register with both the ports 45 and 46, and 45a and 46a, it is necessary to stop the rotation movement of the segmental plate 49 before it reaches either end of its travel. For this purpose the piston 80 is provided. The rod 96 is moved into engagement with the collar recess 95, then, due to the difference in leverage exerted by the lever 66 on the plunger 67 and piston 80, as the said lever is moved the recess 77 gradually comes completely into registry with the passage 72 (or as the recess 75 comes completely into registry with the passage 71) the piston grooves 82 and 83 move completely out of registry with the apertures 84 and 85 respectively. However the movement of plunger 67 and piston 81 was of necessity relatively slow on account of the resistance offered by liquid passing through the passage 80b. Thus enough time would normally elapse during the movement for sufficient liquid to pass through the operating valve to move the segmental plate 49 and the direction valve 33 part way around their path of travel.

I prefer that the interior of the direction valve 33 and the casing space 28g be filled with the hydraulic liquid which is employed in the passages 31 and 31a and in the inlet and discharge passages 44 and 42. In this manner I am relieved of the necessity of providing and maintaining joints for the exclusion of the liquid from certain of the parts. Moreover a suitable mixture of glycerine operates successfully both as a lubricant for the gears 14 and 39, and other parts which should be lubricated, and is also an efficient hydraulic liquid. Around the interior of the housing 1, annular grooves 110 and 111 are formed to reduce the width of the bearing surface for the rim portion 28b of the casing 28.

Any desired means may be employed for filling the interior of the housing 1. In the present instance filler passages 120 extend through the housing ends into the passages 31 and 31a. On one side of the housing a branch passage 120a extends into an annular cavity 121 formed around the supporting boss 17a for the driven shaft 17, through the adjacent side of the end wall 28a of the casing 28 apertures 122 are formed which connect the annular cavity 121 with the interior of the direction valve 33. From the annular housing grooves 110 vent openings 125 are formed through the housing rim to permit escape of air. An inclined passage 126 is formed through the direction valve 33 and through the casing rim 28b to permit the escape of air from within the direction valve 33 into one of the annular grooves 110 from which it is vented in the manner hereinbefore described.

After the interior of the device has been filled it is desirable to withdraw air from the annular cavities 60 through the discharge passages 42. To do this the direction valve 33 is turned to a position substantially central between its two normal operating positions. Then the discharge passages 42 register with special openings 42b formed through the cylindrical casing wall 28c. These openings are in turn connected by two suitable tubular members 42c which extend through openings 141 formed through the casing rim 28b. A conventional vacuum arrangement 150 is secured in an aperture 1d which extends through the housing 1 and terminates in the annular groove 111 into which the tubular members 42c extend. Thus a partial vacuum may be readily obtained in the impeller cavity 60 after which the vacuum tank arrangement is removed and the housing opening 1d is closed as by a plug 1e from which it will be readily understood that the impeller cavities are only partially filled during their operation since a partial vacuum has been obtained in the housing and the tendency is for the annular groove 111 to always remain filled due to static pressure set up in the U-shaped grooves 31 and 31a.

The operation of the transmission is as follows: When the ports 45 and 46 are in registry with the inlet and discharge passages 44 and 42, as the drive shaft 6 is turned the spindle 38 is rotated about its axis through the gears 14 and 39 unless the speed of rotation of the driven shaft 17, and therefore of the casing 28 and direction valve 33 about the driven shaft axis, is as great as that of the said drive shaft. When the driven shaft is stationary and the drive shaft 6 commences to turn the torque is greatest and the greatest speed of rotation of the impellers 41 results. Then liquid is thrown at highest velocity against the bases of the semi-circular grooves or depressions 43, the reaction thereof results in rotation of the casing 28 and of the driven shaft 17. As the speed of the latter increases the kinetic energy exerted through the liquid thrown by the impellers 41 decreases due to the increased speed of rotation of the casing 28 and consequent decrease in speed of rotation of the spindle 38 about its axis. That is, of course, assuming that the speed of the drive shaft 6 remains constant.

While the transmission of power is apparently only accomplished through hydraulic means, mechanical forces are also brought into play; as the torque decreases the momentum of the rotating gear 14 tends to carry the casing 28 around with it, and it will be found that as the speed of the driven shaft 17 more nearly approximates that of the drive shaft 6 very considerable energy is thus mechanically transferred.

Again when the ports 45a and 46a are in communication with the inlet passages 44 and discharge passages 42 the substantially semi-circular grooves or depressions 43 are so positioned that the reaction effect of the liquid, thrown against the bases of the latter, will rotate the casing 28 in the direction opposite to that in which the drive shaft 6 turns, thereby providing means for reversing the direction of rotation of the driven shaft 17. In this case it will be noticed that as the speed of the driven shaft increases the speed of rotation of the impellers 41 also increases, and consequently greater hydraulic power is then exerted against the bases of the grooves 43. However in this case, since the direction of rotation of the shaft 6 is in the reverse direction to that of the shaft 17, no mechanical assistance is afforded to the driven shaft.

Further the arrangement of the transmission is such that it may be readily employed for braking purposes by reversing the valve 33 which may be accomplished at any time during the operation of the transmission.

While in the foregoing the preferred form of construction has been described and shown, it is understood that the invention is susceptible to such alterations and modifications that fall within the scope of the appended claims.

What I claim is:

1. In a transmission, a housing, a drive shaft projecting therefrom, a driven shaft projecting therefrom, a casing in said housing rotating with the driven shaft, a spindle rotatably mounted in the casing at right angles to the drive shaft, means for rotating the spindle from the drive shaft until the speed of the spindle rotation about the driven shaft axis equals that of the drive shaft, impellers on said spindle, passages within said casing through which liquid is delivered to said impellers, walls within the casing adjacent the impeller peripheries, said walls being so formed that when liquid is thrown against them by the impellers rotation of the casing about the axis of the driven shaft results, other passages within the casing through which the liquid thrown against said walls escapes and said housing having annular passages formed therein with which the casing passages register.

2. In a transmission, a housing, a drive shaft projecting from one side thereof and a driven shaft projecting from the other side thereof, said shafts being in alignment with one another, a casing in said housing rotated with the driven shaft, a spindle rotatably mounted in said casing at right angles to the drive shaft, means for rotating the spindle from the drive shaft, impellers on said spindle, means through which liquid is introduced to said impellers, walls within the casing adjacent the peripheries of the impellers, said walls being so formed that when liquid is thrown against them by the impellers rotation of the casing about the driven shaft axis results, means through which liquid thrown against said walls escapes, and annular passages formed in opposite sides of said housing with which the means through which liquid is introduced to the impellers and the means through which liquid thrown against said walls escapes register.

3. In a transmission, a stationary housing, a drive shaft projecting therefrom, a driven shaft projecting therefrom, a casing in said housing rotating with the driven shaft, an element rotatably mounted within said casing, the axis of said element being inclined to the casing axis, a spindle rotatably mounted in said element, means for rotating said spindle from the drive shaft, said element having cavities formed therein, impellers on said spindle within said cavities, inlet passages formed through said element into said cavities, discharge passages formed through said element from said cavities, portions of the peripheries of the cavities being adapted to have liquid thrown against them by the impellers so that rotation of the element and casing about the axis of the driven shaft results, and annular passages formed in the housing which are in registry with the inlet and outlet passages.

4. In a transmission, the combination set forth in claim 3 wherein the element is rotatable within the casing about the spindle axis so that liquid will be thrown by the impellers towards the opposite side of the casing when the element is turned through substantially 180° and cause the casing and driven shaft to turn in the opposite direction.

5. In a transmission, a housing, a drive shaft projecting outwardly to one side thereof, a driven shaft projecting outwardly to the other side thereof, said shafts being in alignment with one another, a casing rotatable in said housing about the axis of the driven shaft, a spindle rotatably supported in said casing at right angles to the drive shaft, a gear on the drive shaft, a gear on the spindle with which the first mentioned gear cooperates, impellers fixed on the spindle extremities, means through which liquid passes and is delivered adjacent the inner margins of said impellers, walls formed in the casing adjacent the peripheries of the impellers so that when liquid is thrown by the latter against said walls rotation of the casing about the driven shaft axis results, means through which liquid thrown against said walls escapes and said housing having passages formed in opposite sides thereof with which the means through which liquid passes to the impellers and the means through which the liquid escapes register.

6. In a transmission, the combination of a stationary housing, a drive shaft and a driven shaft projecting through opposite sides of said housing in alignment with one another, a casing rotatable within the housing which turns with the driven shaft, a spindle rotatably mounted in said casing, a gear on the drive shaft, a pinion on the spindle which meshes with said gear, an element in said casing by which said spindle is rotatably supported, said element having cavities therein, impellers in said cavities mounted on said spindle, opposed annular oil recesses formed in said housing, ports formed through said casing in communication with said recesses, and passages formed through said element adapted to connect said ports with the impeller cavities, said impellers being adapted to throw liquid against a portion of the peripheries of said cavities so that the liquid causes rotation of said element and casing about the driven shaft axis.

7. In a transmission, the combination of a housing, a drive shaft and a driven shaft projecting therefrom, a casing rotatable in said housing about the axis of the driven shaft, an element rotatably mounted in said casing the axis of said element being inclined to the axis of the casing, a spindle rotatable in said element at right angles to the axis of the drive shaft, means for rotating the spindle when the drive shaft turns, said element having cavities formed therein, impellers on said spindle in said cavities, inlet and discharge passages formed through said element into said cavities, liquid containing recesses in said housing, opposed sets of ports through said casing either of which is adapted to connect the inlet and discharge passages in the element with the housing recesses, and means for turning said element in said casing about the spindle axis so that either or neither set of ports registers with said passages said last means also normally holding the element against rotation.

8. In a transmission, the combination of a housing, a drive shaft and driven shaft projecting therefrom, a pump on said housing, means for operating the pump by the rotation of the drive shaft, a casing in said housing rotatable with the driven shaft, an element rotatably mounted in said casing, a spindle rotatably supported by the element at right angles to the driven shaft, means for driving the spindle when the drive shaft is rotated, impellers on said spindle, passages formed through said element through which liquid is delivered to said impellers, other passages formed through said element by which liquid is thrown by said impellers, means rotating the element about the spindle axis so that liquid thrown by the impellers towards the discharge passages will cause the element and casing to turn in either direction selectively about the driven shaft axis and said pump providing hydraulic pressure for operating said rotating means, said last means normally holding the element against rotation.

9. In a transmission, a stationary housing, a drive and a driven shaft projecting therefrom, said shafts being parallel to one another and projecting from opposite sides of the housing, a casing rotatably mounted in said housing, the driven shaft being connected to said casing, said casing having cavities formed therein and two sets of passages extending from said cavities to its outer faces, said housing having annular recesses therein adapted to register with the casing passages, a spindle rotatably mounted in said casing and extending into said cavities, impellers in said cavities fixed on said spindle, and means rotating said spindle when the drive shaft is turned so that liquid entering the cavities through one set of passages is thrown by the impellers against the walls of the other set of passages in the casing and generates kinetic energy by which the casing is rotated, the annular housing recesses permitting the liquid to flow back from the other set of passages to the first set of passages.

10. In a transmission, a stationary housing, a drive and a driven shaft projecting therefrom, a casing rotatably mounted in said housing to which the driven shaft is connected, said casing having apertures formed therein and passages connecting the cavities with the outer surface of said casing, said housing having two opposed annular recesses therein one of which is adapted to register with the casing passages leading to one casing aperture and the other housing recess being adapted to register with the casing passages opening into the other casing aperture, a spindle rotatably mounted in said casing and extending into said cavities, impellers fixed on the spindle in said cavities, liquid being adapted to pass through some of the passages to the impellers by which it is thrown against the walls of the other passages to generate kinetic energy to rotate the casing and driven shaft, the liquid being adapted to return from the latter passages to the first passages through the annular recesses and means rotating the spindle when the drive shaft is turned.

11. In a transmission, a stationary housing, a drive and a driven shaft projecting therefrom, a casing rotatably mounted in said housing to which the driven shaft is connected, said casing having cavities formed therein and passages extending from said cavities through opposed lateral outer faces of said casing, said housing having opposed annular and substantially U-shaped recesses formed therein, the two extremities of each recess being adapted to register with the two casing passages terminating in one of the cavities, a spindle rotatably mounted in said casing and extending into said cavities, the axis of said spindle being inclined to the axis of the driven shaft, impellers fixed on the spindle in said cavities, and means turning the spindle when the drive shaft is turned so that liquid passing through some of the passages to the impellers is thrown by the latter against the walls of the other passages and generates kinetic energy by which the casing is rotated in the housing, said liquid passing through the U-shaped recesses from the other passages back to the first passages.

12. In a transmission, a stationary housing, a drive and a driven shaft projecting therefrom, a casing rotatably mounted in said housing to which the driven shaft is connected, said casing having cavities formed therein, said casing having passages therein extending from said cavities to the casing margins, said housing having annular recesses formed therein the extremities of each of which constantly register with the passages opening into one of said cavities, said cavities being partially filled with liquid during the operation of the transmission, means in the housing recesses for preventing liquid therein from travelling around said recesses about the casing axis, a spindle rotatably mounted in said casing extending into said cavities, impellers on opposite extremities of said spindle in said cavities, and means cooperating with the drive shaft for turning the spindle so that liquid passing through some of the passages is thrown by the impellers against the walls of the other passages thereby generating kinetic energy by which said casing is rotated, said annular recesses connecting the other passages with the first named passages to permit a circulation of the liquid to the impellers.

13. In a transmission, a stationary housing, a drive shaft and a driven shaft projecting therefrom, a casing rotatably mounted in the housing to which the driven shaft is connected, the casing having cavities formed therein, a spindle rotatably mounted in the casing, means rotating the spindle from the drive shaft, said means being so arranged that as the speed of rotation of the casing increases the speed of rotation of the spindle decreases, impellers mounted on the spindle within the cavities, passages formed through the casing extending from the housing to the cavities through which liquid reaches the impellers, other passages in the casing against the walls of which the liquid is thrown by the impellers to generate kinetic energy to turn the casing and driven shaft, and means for permitting the liquid to flow back from the other passages to the first named passages.

14. In a transmission the combination as described in claim 13, wherein the portions through which the casing passages are formed are rotatable on the spindle axis so that some of said passages or the remaining passages may be turned to register with the means for permitting the liquid to flow back from said other passages to said first named passages.

15. In a transmission, a housing, a drive shaft and a driven shaft projecting therefrom, a casing in the housing rotatable with the driven shaft, a spindle rotatable in the casing, the axis of which is inclined to the driven shaft axis, means for turning the spindle from the drive shaft, impellers on both extremities of the spindle in separate cavities formed within the casing, the latter having passages formed therethrough through which liquid within the housing is delivered to the impellers, and other passages therein through which the liquid thrown by the impellers is discharged into the housing, said casing having walls therein so formed that the liquid thrown against them by the impellers before entering the discharge passages generates kinetic energy and causes rotation of the driven shaft, and said housing having liquid storage space therein.

16. In a transmission, a housing, a drive shaft and a driven shaft projecting therefrom, a casing in the housing rotating with the driven shaft and connected thereto, an element mounted in the casing, a spindle in the element, means turning the spindle by the drive shaft rotation, means for turning the element about the spindle axis for neutralizing or reversing the direction of rotation of the driven shaft, impellers on the spindle in cavities formed in the element, the latter and the casing having inlet and discharge passages formed therethrough, the element having walls therein so formed that when liquid is thrown against them by the impellers it causes rotation of the driven shaft.

17. In a transmission, a housing, a drive shaft and a driven shaft projecting therefrom, a casing rotatable in said housing about the driven shaft axis and connected to the driven shaft, a spindle rotatably supported in said casing, means for turning the spindle from the drive shaft, impellers on the spindle mounted in cavities formed within the casing, two sets of inlet and outlet passages formed through the casing, an element rotatable about the spindle axis interposed between the casing and the impellers, said element having one set of inlet and outlet passages therethrough terminating in the impeller cavities, either set of passages through the casing being adapted to register with the element passages, said element having walls formed therein adjacent its outlet passages and extending therefrom, these walls being so formed that when liquid is thrown by the impellers against them kinetic energy is generated which causes rotation of the element, casing and driven shaft about the axis of the latter in one direction or the other according to which set of casing passages is in registry with the element passages, and means for turning the element.

18. In a transmission, a housing, a drive shaft and driven shaft extending therefrom, a casing in the housing rotatably connected to the driven shaft and having two sets of inlet and outlet passages therethrough, a spindle rotatable in the casing, said casing having cavities formed therein, means for turning the spindle from the drive shaft, an impeller fixed on the spindle adjacent each extremity thereof, each impeller being rotatable in one of the cavities, an element interposed between the casing and the impellers having passages therethrough terminating in said cavities, said passages being adapted to register with either set of casing passages and connect them with said cavities, walls formed in the element so that liquid thrown against them by the impellers causes rotation of the casing and driven shaft about the axis of the latter in one direction or the other according to which set of casing passages is in registry with the element passages, and means for moving the element and bringing either set of casing passages into registry with its passages.

19. In a transmission, a housing, a drive shaft and a driven shaft projecting therefrom, a casing in the housing rotatable with the driven shaft, a spindle rotatable in the casing the axis of which is inclined to the drive shaft axis, means for turning the spindle from the drive shaft, impellers on both extremities of the spindle in separate cavities formed within the casing, the casing having passages formed therethrough through which liquid within the housing is delivered to the impellers, and other passages therein through which the liquid thrown by the impellers is discharged, said casing having walls so formed therein that the liquid thrown against them by the impellers before entering the discharge passages generates kinetic energy and causes rotation of the driven shaft, said housing having recesses therein through which the liquid passes to return from the discharge passages to the first named passages, and means in said recesses controlling the flow of liquid therein.

20. In a transmission, a housing, a drive shaft and a driven shaft projecting therefrom, a casing in the housing rotating with the driven shaft and connected thereto, an element mounted in the casing, a spindle in the element, means turning the spindle by the drive shaft rotation, hydraulic means for turning the element about the spindle axis for reversing the direction of rotation of the driven shaft, impellers on the spindle in cavities formed in the element, said element and said casing having inlet and discharge passages formed therethrough, the element having walls therein so formed that when liquid is thrown against them by the impellers it causes rotation of the driven shaft.

21. In a transmission, a housing, a drive shaft and a driven shaft projecting therefrom, a casing in the housing secured to the driven shaft, impellers rotatably mounted about a common axis on opposite sides of the driven shaft axis within the casing, means turning the impellers from the drive shaft rotation, inlet and outlet passages formed through the casing so that liquid may pass through the inlet passages to the impellers, the latter throwing the liquid against walls within the casing to generate kinetic energy and turn the casing about the driven shaft axis, the liquid thrown against said walls passing through the outlet passages, and means permitting the re-entry of the liquid into the inlet passages from the outlet passages.

22. In a transmission as set forth in claim 21, the combination wherein means are provided for changing the radial position of the walls against which the liquid is thrown to reverse the direction of rotation of the casing and driven shaft.

THEODOR B. KOHLER.